United States Patent
Cullen (10) Patent No.: US 6,907,714 B2
(45) Date of Patent: Jun. 21, 2005

(54) BAGGING MACHINE HAVING A COLLAPSIBLE TUNNEL

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 106 days.

(21) Appl. No.: 10/264,161

(22) Filed: Oct. 3, 2002

(65) Prior Publication Data

US 2004/0065059 A1 Apr. 8, 2004

(51) Int. Cl.[7] .............................................. B65B 1/24
(52) U.S. Cl. ........................................ 53/530; 53/567
(58) Field of Search ........................ 53/527, 530, 529, 53/567, 570, 574, 576

(56) References Cited

U.S. PATENT DOCUMENTS

| | | | |
|---|---|---|---|
| 3,687,061 A | 8/1972 | Eggenmuller et al. ........ 100/65 |
| 4,046,068 A | 9/1977 | Eggenmuller et al. |
| 4,518,046 A * | 5/1985 | Rettig et al. ................ 172/311 |
| 5,113,956 A * | 5/1992 | Friesen et al. ............... 172/311 |
| 5,140,802 A | 8/1992 | Inman et al. ................. 53/459 |
| 5,205,107 A * | 4/1993 | Herink ......................... 53/255 |
| 5,295,554 A | 3/1994 | Cullen ......................... 180/236 |
| 5,297,377 A | 3/1994 | Cullen .......................... 53/527 |
| 5,355,659 A | 10/1994 | Cullen .......................... 53/567 |
| 5,367,860 A | 11/1994 | Cullen .......................... 53/576 |
| 5,396,753 A | 3/1995 | Cullen .......................... 53/567 |
| 5,398,736 A | 3/1995 | Cullen ......................... 141/114 |
| 5,408,809 A | 4/1995 | Cullen .......................... 53/567 |
| 5,408,810 A | 4/1995 | Cullen .......................... 53/567 |
| 5,419,102 A * | 5/1995 | Inman et al. ................. 53/567 |
| 5,421,142 A | 6/1995 | Cullen .......................... 53/567 |
| 5,425,220 A | 6/1995 | Cullen .......................... 53/527 |
| 5,463,849 A | 11/1995 | Cullen .......................... 53/527 |
| 5,464,049 A | 11/1995 | Cullen ......................... 141/114 |
| 5,488,996 A * | 2/1996 | Barry et al. ................ 172/311 |
| 5,517,806 A | 5/1996 | Cullen .......................... 53/527 |
| 5,671,594 A | 9/1997 | Cullen .......................... 53/567 |
| 5,724,793 A | 3/1998 | Inman et al. ................. 53/576 |
| 5,775,069 A | 7/1998 | Cullen .......................... 53/567 |
| 5,784,865 A | 7/1998 | Cullen .......................... 53/567 |
| 5,799,472 A | 9/1998 | Cullen .......................... 53/567 |
| 5,857,313 A | 1/1999 | Cullen .......................... 53/567 |
| 5,894,713 A | 4/1999 | Cullen .......................... 53/436 |
| 5,899,247 A | 5/1999 | Cullen ......................... 141/313 |
| 5,904,031 A | 5/1999 | Cullen .......................... 53/567 |
| 5,960,612 A | 10/1999 | Cullen .......................... 53/436 |
| 6,009,692 A | 1/2000 | Cullen .......................... 53/570 |
| 6,550,967 B2 * | 4/2003 | Hedaya ...................... 383/127 |
| 6,708,742 B2 * | 3/2004 | Weathers et al. ........... 141/391 |

* cited by examiner

Primary Examiner—Rinaldi I. Rada
Assistant Examiner—Paul Durand
(74) Attorney, Agent, or Firm—Kolisch Hartwell, P.C.

(57) ABSTRACT

An agricultural bagging machine comprising a wheeled frame having a collapsible tunnel positioned at the rearward end thereof. The tunnel may be positioned in its operative position for bagging purposes but may be collapsed to reduce the width thereof for transport purposes. In another embodiment, the tunnel is selectively movably mounted on the wheeled frame so that the output end thereof may be moved between upper and lower positions.

32 Claims, 7 Drawing Sheets

BAGGING MACHINE HAVING A COLLAPSIBLE TUNNEL

BACKGROUND OF THE INVENTION

1. Field of the Invention

This invention relates to a bagging machine for bagging organic materials such as silage, compost, grains, etc., wherein the tunnel of the bagging machine may be collapsed to reduce the width thereof for transport or shipping purposes.

2. Description of the Related Art

Agricultural feed bagging machines have been employed for several years to pack or bag silage or the like into elongated plastic bags. In recent years, the bagging machines have also been used to pack or back compost material and grain into the elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or other compression means which conveys the silage into a tunnel on which the bag is positioned so that the bag is filled. Applicant has received several patents directed to agricultural feed bagging machines, for example, U.S. Pat. Nos. 5,295,554; 5,297,377; 5,355,659; 5,367,860; 5,396,753; 5,398,736; 5,408,809; 5,408,810; 5,421,142; 5,425,220; 5,463,849; 5,464,049; 5,517,806; 5,671,594; 5,775,069; 5,784,865; 5,799,472; 5,857,313; 5,894,713; 5,899,247; 5,904,031; 5,960,612; and 6,009,692.

Over a period of time, the size of the bagging machines has dramatically increased with the tunnels thereof being of a width sufficient to accommodate bags having a 12-foot diameter. The large width of the tunnel presents a problem when the bagging machine is being transported on public roads which normally limit those widths to approximately 102 inches. Such width restrictions greatly reduce the mobility of the larger machines.

Applicant is aware of U.S. Pat. No. 5,419,102 which issued on May 30, 1995. Although the '102 patent mentions that the tunnel width may be reduced for transporting the bagging machine from one location to another, primarily for overseas shipment, it is not believed that the '102 patent teaches a convenient means for reducing the tunnel width since the '102 patent apparently requires that the wheels somehow be raised up beneath the machine to reduce the width between the wheels of the machine. Further, the '102 patent seems to be lacking in a convenient means for reducing the width of the tunnel. Additionally, the machine of the '102 patent is quite different than the machine described herein. In the '102 patent machine, the auger which conveys the material rearwardly slants up from the front of the machine towards the rear of the machine which places the rearward end of the conveyor auger high in the tunnel. Further, the two sides of the tunnel in the '102 patent move independently of one another. Additionally, the tunnel of the '102 patent is not expanded or contracted as one integrated unit, including the top.

Manufacturers of plastic bags for use with agricultural bagging machines do not have an exact standard for overall (diameter) dimensions, and sizes can vary +/−10%. Also, the elasticity (or strength per allowable stretch tolerance) varies among manufacturers, some allowing more stretch than others. Such variances result in the inability to fill the bags to the fullest with all types of materials, densities, fiber lengths, etc., with the proper tension/stress on the bag skin.

SUMMARY OF THE INVENTION

A bagging machine for bagging organic materials such as grain, compost or silage into a flexible plastic bag having a closed end and an open mouth with the mouth of the bag being positioned on a tunnel which directs the material from a material compression means such as a rotor, packing fingers, packing plate, or screw conveyor into the open mouth of the bag. The tunnel is comprised of first and second tunnel members or "halves" which are hingedly connected together at their upper inner ends to enable the tunnel members to be moved between an operative spread position to a collapsed position so that the machine will have a reduced overall width such that it may be easily transported from one location to another or for shipment purposes. The tunnel may also be moved upwardly or downwardly relative to the ground to maximize the filling of the bag.

It is therefore a principal object of the invention to provide a bagging machine for use in bagging organic material into a bag with the tunnel on the machine being selectively collapsible to reduce the width thereof for transport purposes.

A further object of the invention is to provide a machine of the type described wherein the tunnel thereof is comprised of first and second tunnel members or halves which are hingedly connected together at their upper inner ends.

Still another object of the invention is to provide a collapsible tunnel for an agricultural feed bagging machine.

Yet another object of the invention is to provide a collapsible tunnel for a machine for bagging organic material such as grain, compost or silage.

Still another object of the invention is to provide a bagging machine for use in bagging organic material into a bag with the tunnel of the machine being selectively vertically movable to maximize the filling of the bag.

Still another object of the invention is to provide a bagging machine for use in bagging organic material into a bag with the rearward end of the tunnel of the machine being selectively vertically movable to maximize the filling of the bag.

These and other objects of the invention will be apparent to those skilled in the art.

DESCRIPTION OF THE PREFERRED EMBODIMENT

With respect to FIGS. 1–6, the numeral 10 refers to an agricultural bagging machine which is substantially conventional in design except for the fact that the machine may accommodate different tunnel sizes. Machine 10 includes a wheeled frame means 12. Frame means 12 includes a hopper 14 at the forward end thereof having an inclined front hopper panel 16, rear face panel 18, and opposite sides 20 and 22. The shape of the hopper is not critical to this invention. Further, the hopper could be replaced by a feed table, conveyor, etc.

A rotatable rotor 24 of conventional design is illustrated and is located at the lower end of the hopper 14 for forcing the materials to be bagged into the tunnel and into the bag as will be described in more detail hereinafter. The rotor does not form a part of the invention and could be replaced with conventional means such as packing fingers, screw conveyor, plunger, etc. For purposes of conciseness, the power means for driving the various components of the machine have not been disclosed since the same does not form a part of the invention. The power means could be an engine mounted on a machine or a PTO shaft connected to a tractor PTO.

Figure 2:
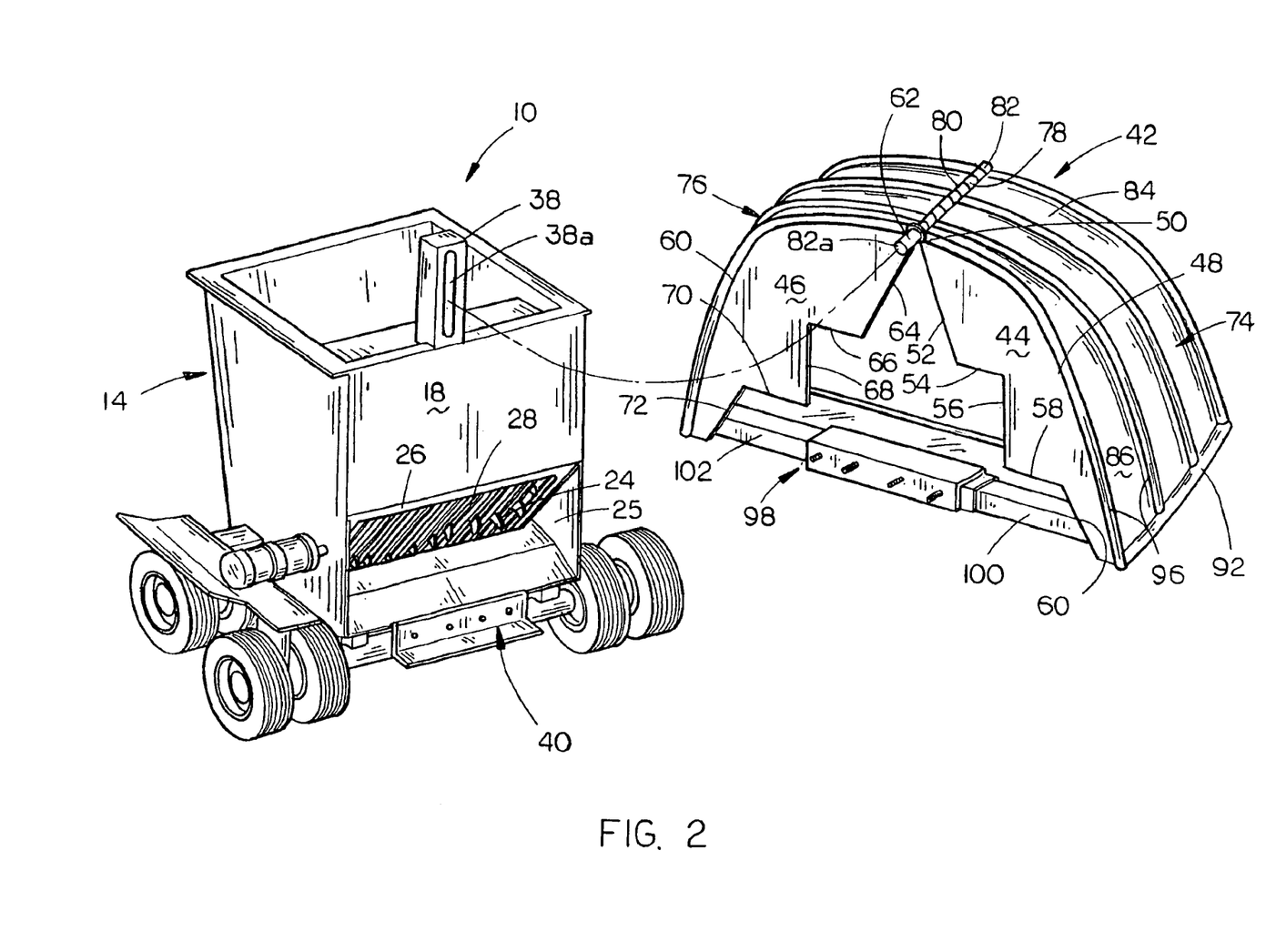
FIG. 2 is an exploded perspective view of the bagging machine of FIG. 1.

Face panel 18 is provided with an opening or passageway 25 formed therein at the lower end thereof, as best seen in FIG. 2. Machine 10 includes a main cross frame member 26 which has a plurality of spaced-apart stripping teeth 28 secured thereto which extend downwardly and forwardly therefrom, as illustrated in FIG. 2.

Machine 10 includes an upstanding hinge track 38 at its upper rearward end and an L-shaped bracket support 40 at its lower rearward end. The numeral 42 refers generally to the collapsible tunnel of this invention which may be of any desired width and which is supported by the support 40.

Tunnel 42 includes tunnel face plates 44 and 46, as seen in FIG. 2. Tunnel face plate 44 includes an arcuate outer edge 48 which extends downwardly and outwardly from the upper inner end 50 of face plate 44. Face plate 44 also includes an inner edge defined by edge portions 52, 54, 56, 58 and 60, as seen in FIG. 2. Similarly, face plate 46 includes an arcuate outer edge 60 which extends downwardly and outwardly from the upper end 62 of face plate 46. Face plate 46 also includes an inner edge defined by edge portions 64, 66, 68, 70 and 72, as seen in FIG. 2.

Figure 6:
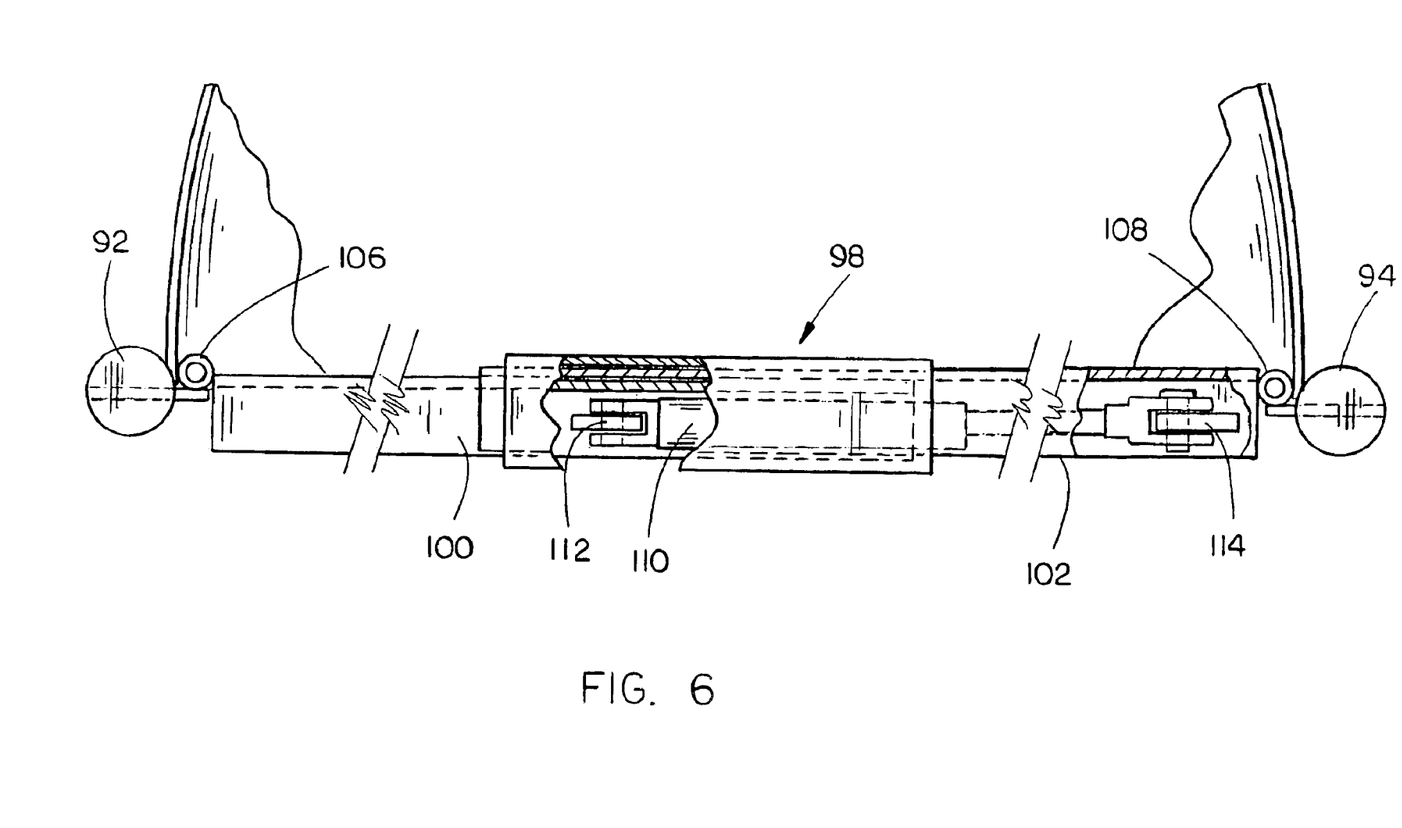
FIG. 6 is a rear elevational view of the means for moving the tunnel between collapsed and operative positions.

Referring to FIG. 2, tunnel 42 further includes tunnel halves or members 74 and 76 which are hingedly connected together at their upper inner ends 78 and 80 by a hinge 82. Hinge 82 has a forwardly projecting portion 82a which is received in the slot 38a of hinge guide 38. For purposes of description, tunnel member 74 will be described as including a top wall portion 84 and a side wall portion 86. Tunnel member 76 will be described as including a top portion 88, and a side wall portion 90. The lower ends of side walls 86 and 90 of tunnel members 74 and 76, respectively, are provided with reinforcing members 92 and 93, respectively. It is also preferred that the tunnel 42 be provided with spaced-apart reinforcing members 96, as seen in the drawings. The forward ends of tunnel members 74 and 76 are rigidly secured to the tunnel face plates 44 and 46, respectively, for movement therewith. A slide tube case 98 is positioned between the lower inner ends of face plates 44 and 46 and has channel members 100 and 102 slidably mounted therein, as seen in FIG. 6. Although square channel members are shown, cylindrical pipe members could also be utilized if desired. The outer end of channel member 100 is hingedly connected to reinforcing member 92 by hinge 106 (FIG. 6). The outer end of channel member 102 is hingedly connected to the reinforcing member 94 by hinge 108. One end of an elongated actuator 110 is connected to the inner end of channel member 100 at 112. The other end of the actuator 110 is connected to channel member 102 at 114. Actuator 110 may comprise a hydraulic cylinder, an air cylinder or an electric actuator. Further, a single actuator 110 may be replaced by a pair of actuators, if so desired. Additionally, a pair of vertically spaced actuators could be used if desired, one at the lower end of the tunnel and one positioned thereabove. Extension of the actuator 110 causes the channel members 100 and 102 to slidably extend from opposite ends of the slide case 98 so that the lower ends of the tunnel members 74 and 76 are moved outwardly with respect to the slide case 98 which is secured to support 40, as seen in the drawings. Retraction of the actuator 110 causes the lower ends of the tunnel members 74 and 76 to move towards the slide case 98.

Figure 1:
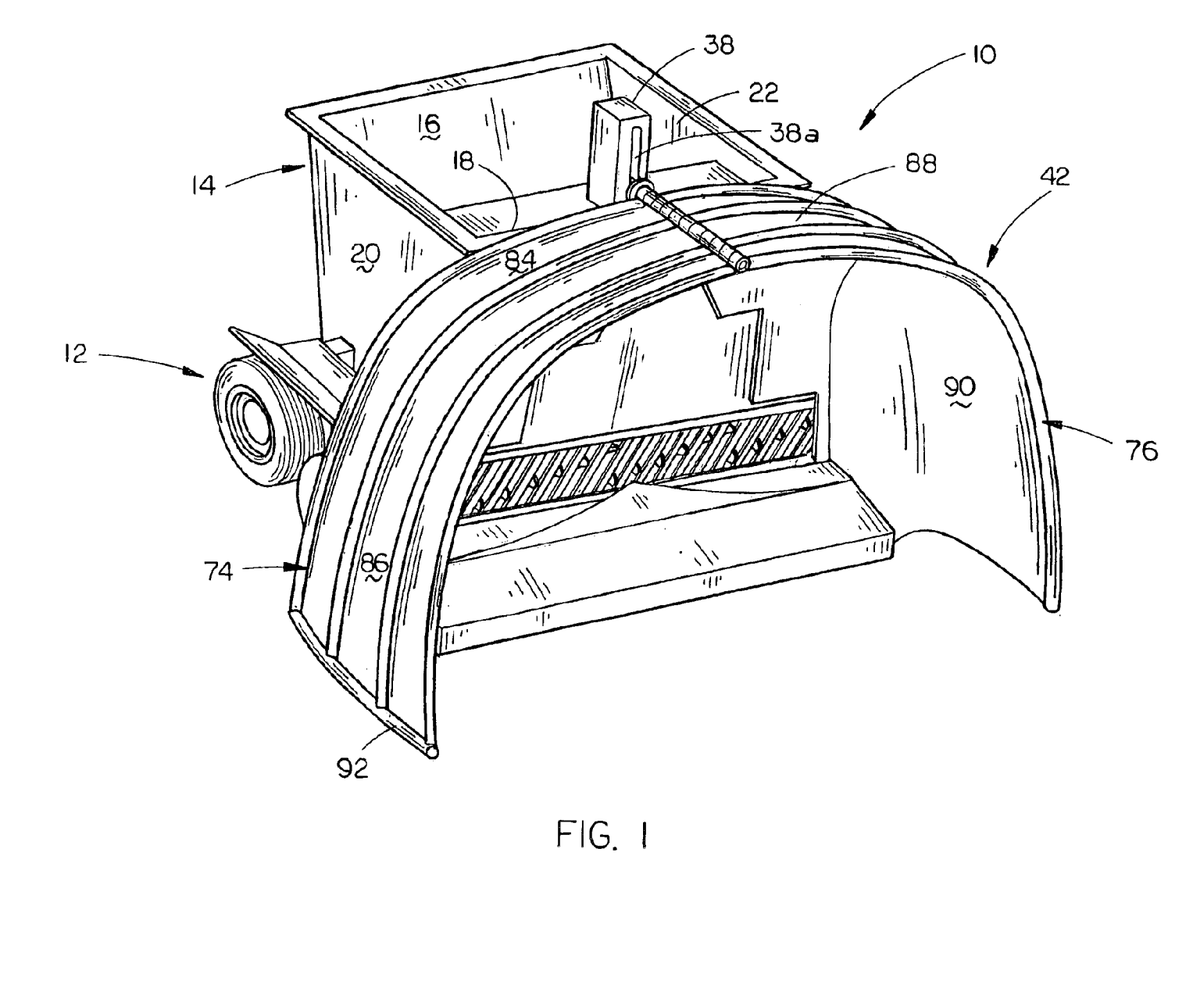
FIG. 1 is a rear perspective view of the bagging machine of the invention with the tunnel thereof being in an operative bagging position.
Figure 3:
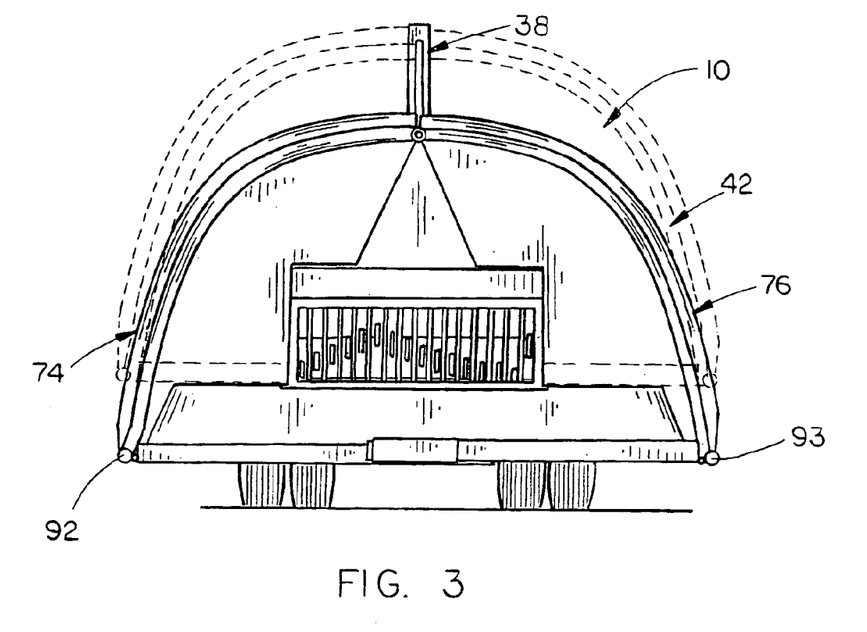
FIG. 3 is a rear view of the bagging machine of FIG. 1 with the broken lines illustrating the possible vertical movement of the tunnel.
Figure 4:
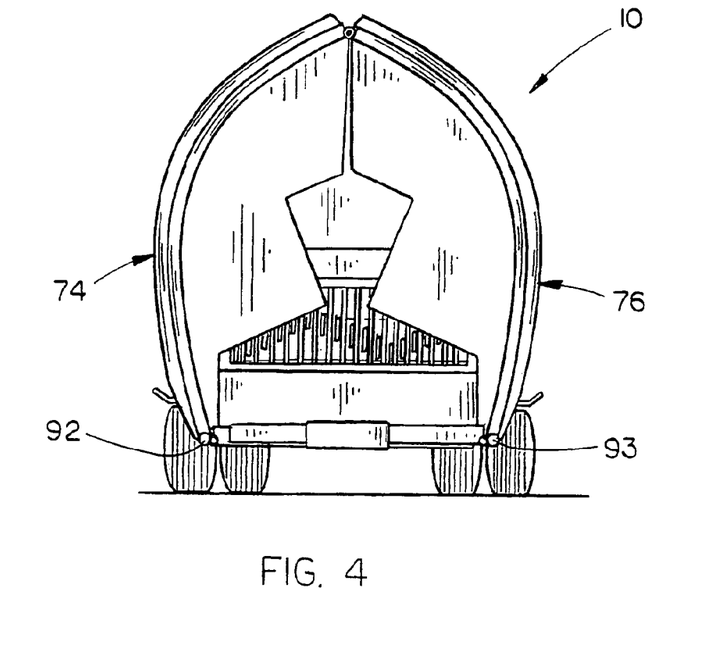
FIG. 4 is a rear view of the bagging machine of FIG. 1 with the tunnel thereof in a collapsed position.
Figure 5:
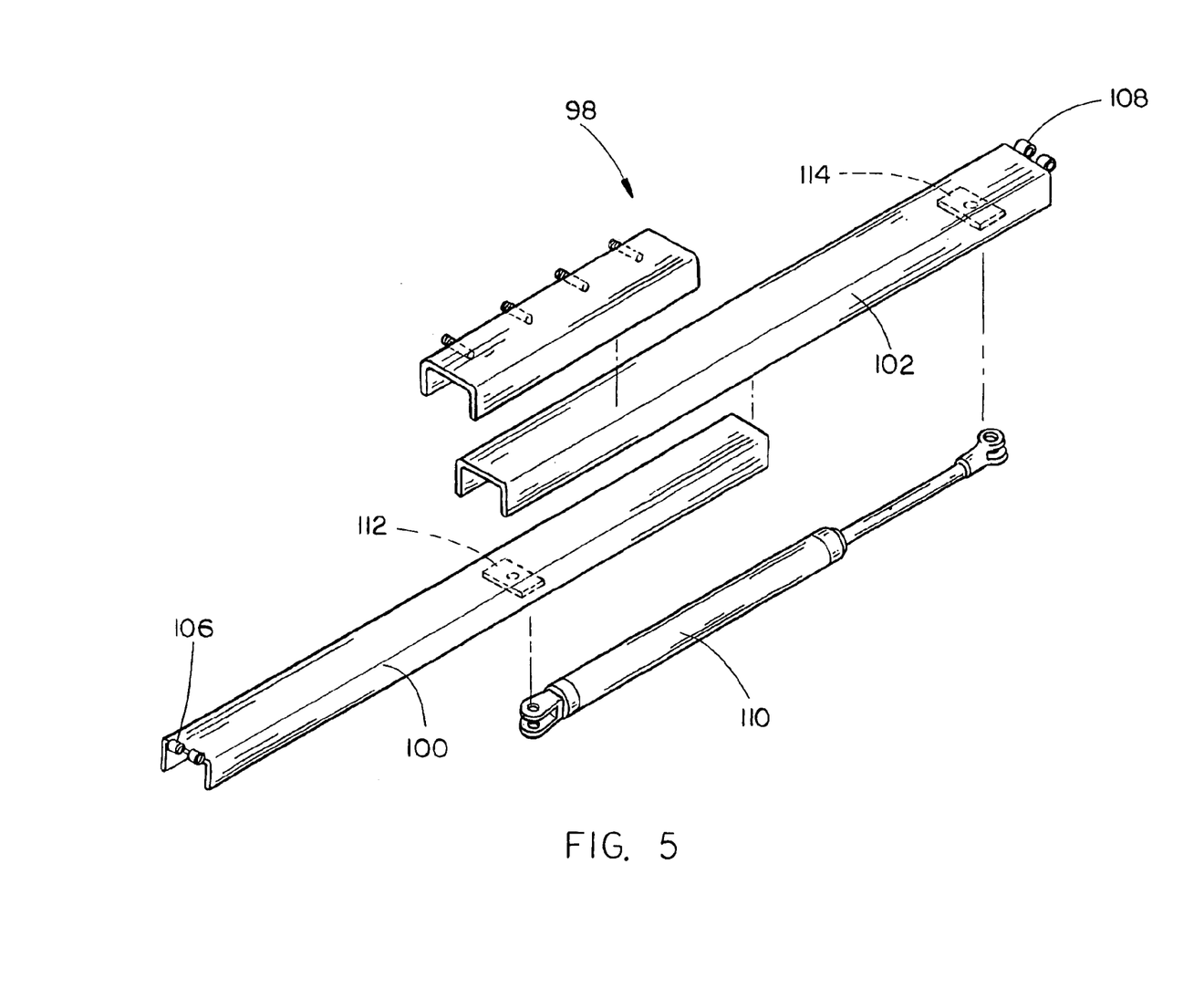
FIG. 5 is an exploded perspective view of the means for moving the tunnel between collapsed and operative positions.

FIGS. 1 and 3 illustrate the tunnel 42 in its operative bagging position. When it is desired to reduce the width of the tunnel for transport purposes, the actuator 110 is retracted which draws or pulls the lower ends of the tunnel members 74 and 76 towards the slide case 98 which causes the hinge 82 to move upwardly with the hinge portion 82a moving upwardly within the slot 38a of hinge guide 38. With the tunnel 42 in its collapsed position, the width of the machine and the tunnel is well within normal road width restrictions. When the bagging machine has been transported to the desired location, the hydraulic actuator 110 is actuated to extend the channel members 100 and 102 outwardly from the slide case 98 to again position the tunnel in its operative position. As the actuator 110 moves the lower ends of the tunnel members 74 and 76 outwardly, the hinge portion 82 moves downwardly in the slot 38a of hinge guide 38.

Thus it can be seen that a novel bagging machine has been described which includes a collapsible tunnel so that the bagging machine may accommodate extremely large bags but may have its width reduced for transport or shipping purposes.

Figure 7:
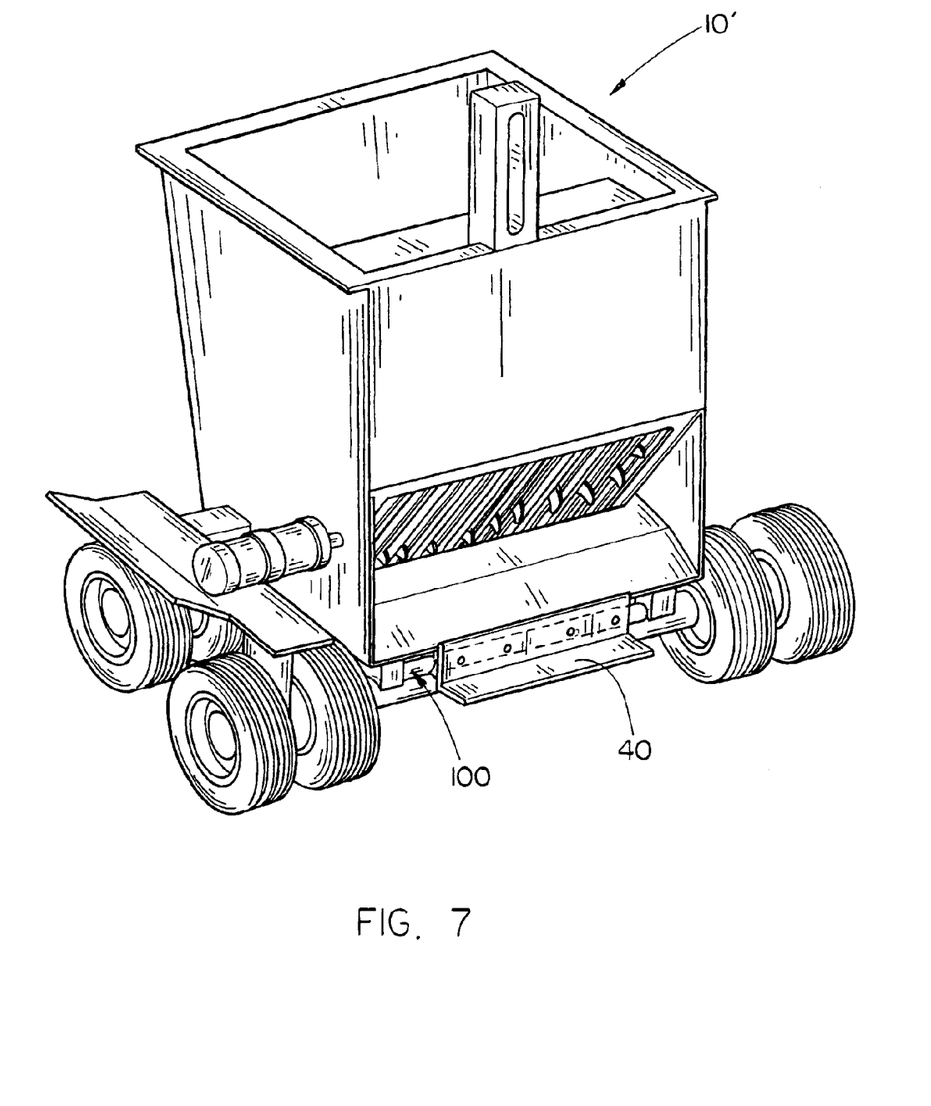
FIG. 7 is a rear perspective view similar to FIG. 2 except that the machine of FIG. 7 is able to vertically move the tunnel thereof.
Figure 8:
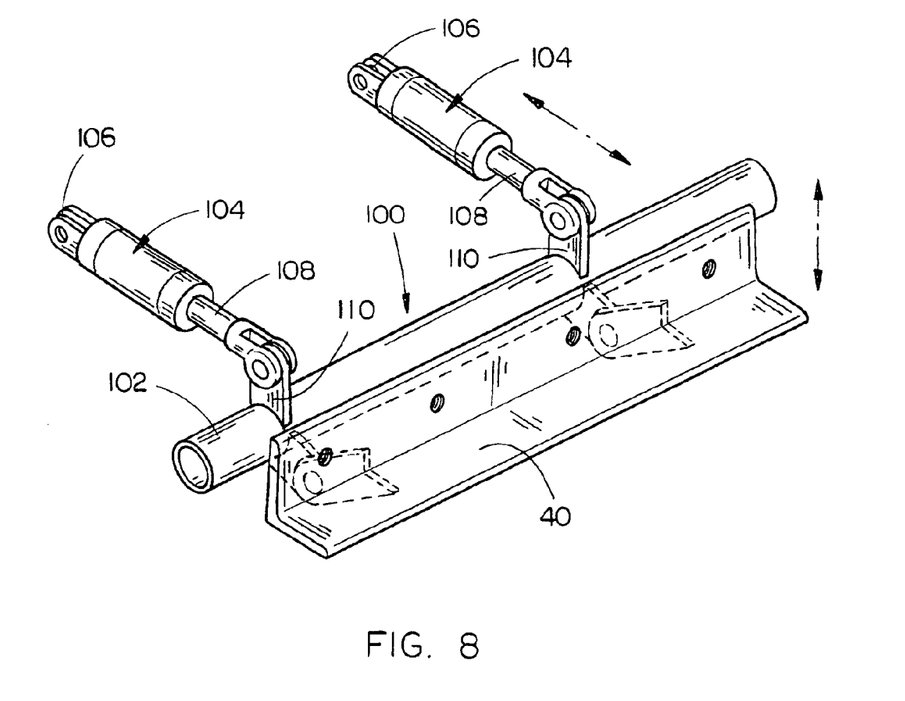
FIG. 8 is a rear perspective view which illustrates the mechanism for vertically moving the tunnel of the machine of FIG. 7.
Figure 9:
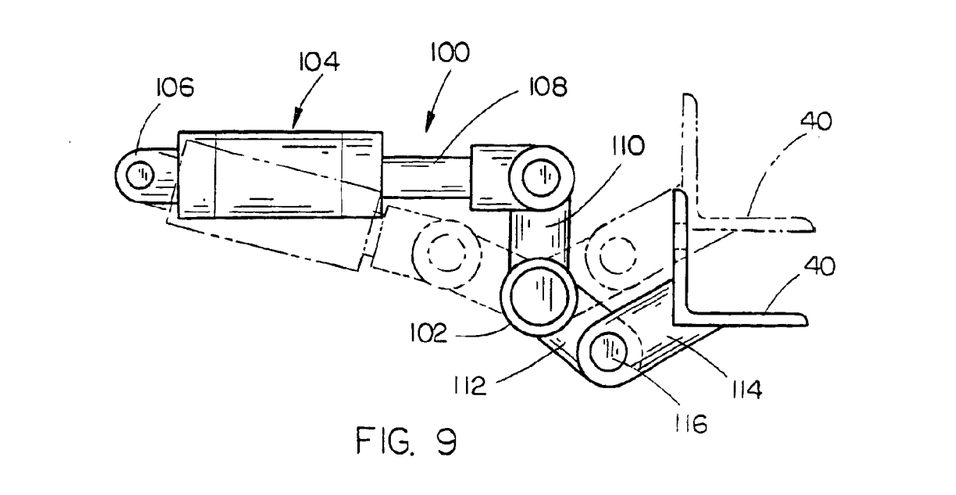
FIG. 9 is a side view of the mechanism of FIG. 8 with the broken lines illustrating the vertical movement thereof.

A further embodiment of the bagging machine of this invention is illustrated in FIGS. 7–9. The primary difference between the machine 10' of FIGS. 7–9 and the machine 10 of FIGS. 1–6 is that the machine 10' includes a mechanism for raising and lowering the tunnel mounted thereon for maximizing the filling of the bag. As stated hereinbefore, manufacturers of plastic bags for use with agricultural bagging machines do not have an exact standard for overall (diameter) dimensions, and sizes can vary +/-10%. Also, the elasticity (or strength per allowable stretch tolerance) varies among manufacturers, some allowing more stretch than others. Such variances result in the inability to fill the bags to the fullest with all types of materials, densities, fiber lengths, etc., with the proper tension/stress on the bag skin. In machine 10' of FIGS. 7–9, a mechanism 100 is illustrated for selectively raising and lowering the L-shaped bracket support 40 which supports the tunnel in the embodiment of FIGS. 1–6. FIG. 3 illustrates with broken lines the possible upward and downward movement of the tunnel regardless of whether the tunnel is collapsible or not.

Mechanism 100 includes a horizontally disposed rotatable pipe, tube or shaft 102 which is rotatably mounted on the machine 10' by any convenient means. One or more hydraulic cylinders 104 are pivotally connected at their forward ends 106 to the machine 10' by any convenient means and have the rearward ends of the rods 108 thereof pivotally connected to ears 110 which are secured to pipe 102 to cause the rotation thereof upon extension or retraction of the rods 108. Two or more brackets 112 are welded or otherwise secured to member 102 and extend rearwardly therefrom. The rearward ends of brackets 112 are pivotally secured to brackets 114 at 116, as seen in FIG. 9. The rearward ends of brackets 114 are welded or otherwise secured to the L-shaped support 40 which supports the lower forward end of the tunnel. The upper forward end of the tunnel may be vertically movably connected to the hinge track 38.

Thus, if the diameter of the bag being used on the tunnel of the bagging machine is slightly oversized, the support 40 and the tunnel mounted thereon is raised, such as indicated by the broken lines in FIG. 9, by the cylinders 104 to maximize the filling of the bag thereby enabling additional material to be placed in the bag. The support 40 and the tunnel thereon may be selectively raised or lowered to accommodate different stretch characteristics of the bags or accommodate different densities, fiber lengths, etc. The mechanism 100 may be used with collapsible or non-collapsible tunnels (FIG. 3). It can therefore be seen that a unique means has been provided for maximizing the filling of the bags being used with bagging machines.

While it is preferred that the upper forward end of the tunnel be substantially vertically moved within the hinge track 38, the upper forward end of the tunnel could be pivoted to the machine, about a horizontal axis, so that upward or downward movement of the lower forward end of the tunnel will cause the upper rearward end of the tunnel to be moved in an arc-like fashion as opposed to a perfectly vertical path. The goal of the invention is to move the rearward end of the tunnel with respect to the ground whether that movement is perfectly vertical or not.

Thus it can be seen that the invention accomplishes at least all of its stated objectives.

I claim:

1. A bagging machine for placing material into a bag having a closed end and an open mouth, the bagging machine comprising:
    a first tunnel member movably coupled to the bagging machine having a forward end, a rearward end, a top wall extending between said forward and rearward end, and a side wall extending downwardly from said top wall;
    said top wall of said first tunnel member having an inner end;
    a second tunnel member movably coupled to the bagging machine having a forward end, a rearward end, a top wall extending between said forward and rearward end, and a side wall extending downwardly from said top wall;
    said top wall of said second tunnel member having an inner end;
    said inner ends of said top walls of said first and second tunnel members being movably coupled to permit said side walls of said first and second tunnel members to be selectively moved about a single axis of rotation towards one another and to be selectively moved about a single axis of rotation away from each other.

2. The bagging machine of claim 1 wherein said inner ends of said first and second tunnel members are hingedly secured together.

3. The bagging machine of claim 1 wherein said inner ends of said first and second tunnel members are hingedly secured together about a horizontal axis which is parallel to the direction of movement of the bagging machine.

4. The bagging machine of claim 1 wherein a horizontally extending coupling mechanism is secured to and extends between said first and second tunnel members.

5. The bagging machine of claim 1 further including means for moving said tunnel members toward one another and away from one another.

6. The bagging machine of claim 1 wherein said tunnel members are movably mounted on the bagging machine between upper and lower positions.

7. The bagging machine of claim 1 wherein said rearward ends of said tunnel members are selectively movable between upper and lower positions.

8. A bagging machine for placing material into a bag having a closed end and an open mouth, the bagging machine comprising:
    a first tunnel member movably coupled to the bagging machine having a forward end, a rearward end, a top wall extending between said forward and rearward end and having an inner end, and a side wall extending downwardly from said top wall and having a lower end;
    a second tunnel member movably coupled to the bagging machine having a forward end, a rearward end, a top wall extending between said forward and rearward end and having an inner end, and a side wall extending downwardly from said top wall and having a lower end; and a horizontally extending coupling mechanism secured to and extending between the lower ends of said side walls of said first and second tunnel members;
    said inner ends of said top walls of said first and second tunnel members being movably coupled to permit said side walls of said first and second tunnel members to be selectively moved towards one another and U be selectively moved away from each other.

9. The bagging machine of claim 8 wherein each of said first and second tunnel members have rearward and forward ends and wherein said coupling mechanism extends between said side walls of said first and second tunnel members adjacent the lower ends thereof.

10. A bagging machine for placing material into a bag having a closed end and an open mouth, the bagging machine comprising:
    a first tunnel member movably coupled to the bagging machine having a forward end, a rearward end, a top wall extending between said forward and rearward end and having an inner end, and a side wall extending downwardly from said top wall;
    a second tunnel member movably coupled to the bagging machine having a forward end, a rearward end, a top wall extending between said forward and rearward end and having an inner end, and a side wall extending downwardly from said top wall; and
    a horizontally extending coupling mechanism secured to and extending between said first and second tunnel members, wherein said coupling mechanism comprises a rigid telescopic means;
    said inner ends of said top walls of said first and second tunnel members being movably coupled to permit said side walls of said first and second tunnel members to be selectively moved towards one another and to be selectively moved away from each other.

11. A bagging machine for placing material into a bag having a closed end and an open mouth, the bagging machine comprising:
    a first tunnel member movably coupled to the bagging machine having a forward end, a rearward end, a top wall extending between said forward and rearward end and having an inner end, and a side wall extending downwardly from said top wall;

a second tunnel member movably coupled to the bagging machine having a forward end, a rearward end, a top wall extending between said forward and rearward end and having an inner end, and a side wall extending downwardly from said top wall;

said inner ends at said top walls of said first and second tunnel members being movably coupled to permit said side walls of said first and second tunnel members to be selectively moved towards one another and to be selectively moved away from each other, wherein first and second face plates are secured to the forward ends of said first and second tunnel members, respectively; each of said face plates dwelling in a plane which is generally transverse to said top wall and said side wall thereof.

12. The bagging machine of claim 11 wherein said face plates are secured to said tunnel members for movement therewith.

13. The bagging machine of claim 12 wherein each of said face plates has an outer edge which is generally complementary in shape to the forward end of the associated tunnel member.

14. The bagging machine of claim 13 wherein each of said face plates has an inner edge which is shaped to permit the material being bagged to pass therethrough when the tunnel members are in their operative position.

15. The bagging machine of claim 13 wherein each of said face plates has an inner edge which is shaped to permit said face plates to move towards one another as said tunnel members are moved towards one another.

16. A bagging machine for placing material into a bag having a closed end and an open mouth, the bagging machine comprising:

a first tunnel member movably coupled to the bagging machine having a forward end, a rearward end, a top wall extending between said forward and rearward end and having an inner end, and a side wall extending downwardly from said top wall;

a second tunnel member movably coupled to the bagging machine having a forward end, a rearward end, a top wall extending between said forward and rearward end and having an inner end, and a side wall extending downwardly from said top wall; and a horizontally extending coupling mechanism secured to and extending between said first and second tunnel members;

said inner ends of said top walls of said first and second tunnel members being movably coupled to permit said side walls of said first and second tunnel members to be selectively moved towards one another to a collapsed position and to be selectively moved away from each other to an operative bagging position, wherein said coupling mechanism causes said inner ends of said top walls of said first and second tunnel members to move upwardly as said tunnel members are moved to their collapsed position and to move downwardly as said tunnel members are moved to their operative position.

17. A bagging machine for placing material into a bag having a closed end and an open mouth, comprising:

a wheeled frame having a forward end and a rearward end;

first means associated with said frame for receiving the material to be bagged;

a tunnel, having forward and rearward ends, at the rearward end of said wheeled frame for directing the material into the bag;

second means associated with said frame which receives the material from said first means and which transports the material into said tunnel;

said tunnel comprising first and second tunnel members;

said first tunnel member having a forward end, a rearward end, a top wall extending between said forward and rearward end, and a side wall extending downwardly from said top wall;

said top wall of said first tunnel member having an inner end;

said second tunnel member having a forward end, a rearward end, a top wall extending between said forward and rearward end, and a side wall extending downwardly from said top wall;

said top wall of said second tunnel member having an inner end;

said inner ends of said top walls of said first and second tunnel members being movably secured together to permit said side walls of said first and second tunnel members to be selectively moved towards one another to a collapsed position and to be selectively moved away from each other to an operative bagging position.

18. The bagging machine of claim 17 wherein said inner ends of said first and second tunnel members are hingedly secured together.

19. The bagging machine of claim 17 wherein said inner ends of said first and second tunnel members are hingedly secured together about a horizontal axis which is parallel to the direction of movement of the bagging machine.

20. The bagging machine of claim 17 wherein a horizontally extending interconnection means is secured to and extends between said first and second tunnel members.

21. The bagging machine of claim 20 wherein each of said side walls of said first and second tunnel members have lower ends and wherein said interconnection means extends between the lower ends of said side walls of said first and second tunnel members.

22. The bagging machine of claim 21 wherein each of said first and second tunnel members have rearward and forward ends and wherein said interconnection means extends between said side walls of said first and second tunnel members adjacent the lower ends thereof.

23. The bagging machine of claim 20 wherein said interconnection means comprises a rigid telescopic means.

24. The bagging machine of claim 20 wherein said interconnection means causes said inner ends of said top walls of said first and second tunnel members to move upwardly as said tunnel members are moved to their collapsed position and to move downwardly as said tunnel members are moved to their operative position.

25. The bagging machine of claim 17 wherein first and second face plates are secured to the forward ends of said first and second tunnel members, respectively; each of said face plates dwelling in a plane which is generally transverse to said top wall and said side wall thereof.

26. The bagging machine of claim 25 wherein said face plates are secured to said tunnel members for movement therewith.

27. The bagging machine of claim 26 wherein each of said face plates has an outer edge which is generally complementary in shape to the forward end of the associated tunnel member.

28. The bagging machine of claim 27 wherein each of said face plates has an inner edge which is shaped to permit the material being bagged to pass therethrough when the tunnel members are in their operative position.

29. The bagging machine of claim 27 wherein each of said face plates has an inner edge which is shaped to permit said face plates to move towards one another as said tunnel members are moved towards one another.

30. The bagging machine of claim 17 further including means for moving said tunnel members toward one another and away from one another.

31. The bagging machine of claim 17 wherein said tunnel is removably mounted on said wheeled frame between upper and lower positions.

32. The bagging machine of claim 17 wherein said rearward end of said tunnel is selectively movable between upper and lower positions.

* * * * *